United States Patent
Vahle

(10) Patent No.: US 11,318,854 B2
(45) Date of Patent: May 3, 2022

(54) PROTECTIVE DEVICE

(71) Applicant: AUDI AG, Ingolstadt (DE)

(72) Inventor: Sebastian Vahle, Landshut (DE)

(73) Assignee: AUDI AG, Ingolstadt (DE)

( * ) Notice: Subject to any disclaimer, the term of this patent is extended or adjusted under 35 U.S.C. 154(b) by 324 days.

(21) Appl. No.: 16/686,500

(22) Filed: Nov. 18, 2019

(65) Prior Publication Data

US 2020/0198486 A1  Jun. 25, 2020

(30) Foreign Application Priority Data

Dec. 20, 2018 (DE) .......................... 102018222470.6

(51) Int. Cl.
 *B60L 53/18* (2019.01)
 *B60L 53/16* (2019.01)
 *H01R 13/52* (2006.01)

(52) U.S. Cl.
 CPC ............... *B60L 53/18* (2019.02); *B60L 53/16* (2019.02); *H01R 13/5213* (2013.01)

(58) Field of Classification Search
 CPC ...... B60L 53/18; B60L 53/16; H01R 13/5213
 USPC ........................................................ 320/109
 See application file for complete search history.

(56) References Cited

U.S. PATENT DOCUMENTS

| 2013/0257373 | A1* | 10/2013 | Mallon, IV | ............. | B60L 53/31 |
| | | | | | 320/109 |
| 2018/0334048 | A1* | 11/2018 | Hollmig | ................. | B62D 21/17 |
| 2020/0313328 | A1* | 10/2020 | Mathews | ............. | H01R 13/005 |
| 2021/0135396 | A1* | 5/2021 | Knudtzon | ................ | B60L 53/16 |
| 2021/0358657 | A1* | 11/2021 | Shabgard | ................. | H01B 7/42 |

FOREIGN PATENT DOCUMENTS

| CN | 103098331 | A | * | 5/2013 | ............. | E04H 6/282 |
| CN | 112977128 | A | * | 6/2021 | | |
| CN | 113013690 | A | * | 6/2021 | | |
| DE | 102009052366 | A1 | | 7/2010 | | |
| DE | 102011011461 | A1 | * | 8/2011 | | |
| DE | 102011011461 | A1 | | 8/2011 | | |
| DE | 202012009032 | U1 | | 11/2012 | | |
| EP | 3882929 | A1 | * | 9/2021 | | |
| GB | 2503229 | A | * | 6/2012 | | |
| GB | 2499570 | A | * | 8/2013 | ............. | B60L 53/16 |

(Continued)

OTHER PUBLICATIONS

German Office Action dated Sep. 22, 2020, in connection with corresponding DE Application No. 10 2018 222 470.6 (11 pp., including machine-generated English translation).

(Continued)

*Primary Examiner* — Suresh Memula

(74) *Attorney, Agent, or Firm* — Maier & Maier, PLLC

(57) ABSTRACT

A protective device for an electrical charging cable for connecting two mechanisms in a charging process. The protective device has a supporting frame and a jacket, which are designed to enclose a cavity extending in a longitudinal direction. Through the cavity a charging cable can be guided, and the supporting frame and the jacket are deformable in the longitudinal direction. A length of the protective device is to be modified and a length of the charging cable to be guided through the cavity is to be adapted between the two mechanisms.

10 Claims, 2 Drawing Sheets

(56) References Cited

FOREIGN PATENT DOCUMENTS

GB 2503229 A 12/2013

OTHER PUBLICATIONS

German Examination Report dated Oct. 10, 2019 in corresponding German Application No. 102018222470.6; 20 pages; Machine translation attached.

Search Report dated Mar. 18, 2020 in corresponding European Application No. 19205009.4; 15 pages including partial machine-generated English-language translation.

* cited by examiner

PROTECTIVE DEVICE

FIELD

The invention relates to a protective device for a charging cable, a system for protecting a charging cable, and a method for protecting a charging cable.

BACKGROUND

A charging cable for supplying an electrically driven vehicle is subjected to weather, e.g. snow and rain, when plugged in, when the charging cable is connected to a charging station, and can thus become very soiled. When this is a charging cable specific to the vehicle, it must be stowed in the interior of the vehicle in the soiled state. In addition, there is no protection against damage to the charging cable.

Publication DE 20 2012 009 032 U1 describes a permanently integrated charging station with a charging cable for an electrical device.

Publication DE 10 2009 052 366 A1 describes a vehicle with an electromotive drive.

A charging cable locking mechanism for a vehicle is known from publication DE 10 2011 011 461 A1.

SUMMARY

Against this backdrop, an object was to protect a charging cable for a vehicle from environmental influences.

This object is achieved by means of a protective device, a system, and a method having the features according to the independent claims. Embodiments of the protective device, of the system, and of the method arise from the dependent claims.

The protective device according to the invention is provided for an electrical charging cable, which is designed to electrically connect a first mechanism to a second mechanism for implementing an electric charging process and to transport electrical energy between the mechanisms. The protective device has a supporting frame and a jacket, which are formed, in a tubular manner, to encase and/or to enclose a cavity for the charging cable in a longitudinal direction. In doing so, the cavity to be encased and/or enclosed by the supporting frame and the jacket extends in the longitudinal direction, wherein the charging cable can be guided or is guided though the cavity. The protective device and the cavity, which is formed or can be formed though the protective device, are designed to accommodate the charging cable. The supporting frame and the jacket are deformable in the longitudinal direction, wherein and/or whereby a length of the protective device can be modified or is to be modified and adapted or can be adapted to a length of the charging cable between the two mechanisms.

In the design of the protective device, at least one section, i.e. a single section or several sections, of the supporting frame is connected to at least one section, i.e. to one single section or several sections, of the jacket, wherein the at least one section of the supporting frame and the at least one section of the jacket are deformable, jointly and/or simultaneously, in the longitudinal direction.

Furthermore, the supporting frame is formed from helical- and/or spiral-shaped material. The jacket is typically formed from a deformable material. In doing so, it is possible that the material for the jacket is flexibly, non-rigidly, and/or elastically deformable. In this case, it is possible, when the supporting frame, and thus the supporting device, has a maximum length in an unfolded state, that the jacket is or will be unfolded and/or tensioned by means of the supporting device, which is expanded in this case. In contrast, the jacket is or will be relaxed by the supporting device, which is compressed in this case, when the supporting frame and thus the supporting device are in an assembled state, wherein it is possible that the at least one section of the jacket is relaxed and/or folded.

As designed, the supporting frame is formed from metal, for example from spiral-shaped wire, e.g. metal wire, and/or from plastic, for example spiral-shaped wire, e.g. plastic wire and/or plastic filament, wherein the supporting frame may also be formed from a combination of metal and plastic and is formed, for example, from a metal wire coated with plastic. The metal, for example the metal wire for the supporting frame, is made, for example, from a strong steel. The wire, i.e. metal wire, is normally from a thin, long, and flexibly formed metal with an elliptical, for example circular, or angular, for example flat and/or square-shaped, cross-section and/or profile. It is possible that the term plastic wire is also used for stronger plastic filaments. A polymer monofilament having a certain stiffness, a polyethylene wire, or a nylon wire may likewise be characterized as a wire, particularly plastic wire.

Furthermore, the jacket is formed from plastic, for example plastic fabric, from textile material, for example textile fabric, from Kevlar, for example Kevlar fabric, and/or from metal, for example metal fabric, wherein the jacket may optionally also be formed from a combination of several of the aforementioned materials.

The protective device has two ends, wherein each end is connected to one of the two mechanisms. In doing so, it is possible that one of the ends is permanently connected to one of the two mechanisms and is attached to said mechanism, whereas the other end is to be or can be temporarily and detachably mechanically connected to the other mechanism. Alternatively, it is conceivable that the protective device, i.e. each of its two ends, is to be or can be temporarily and detachably mechanically connected to both mechanisms. To this end, the supporting device has at least one attachment device on at least one end, wherein the at least one attachment device is formed to at least temporarily and detachably mechanically connect at least one end of the protective device to at least one of the two mechanisms. In doing so, the at least one attachment device may be magnetic and adhere to a metallic region of each of the mechanisms. It is also possible that the at least one attachment device has a lock and/or a locking device, with which the attachment device is to be or can be temporarily and detachably attached to a matching attachment module of the respective mechanism.

As designed, the protective device is designed for protecting a charging cable, with which a vehicle, for example a motor vehicle, as a first mechanism, is connected to an electrical charging station, for example a charging point, as a second mechanism, wherein the electrical energy with the charging process is transferred from the charging station to the motor vehicle; in doing so, the protective device is designed to protectively enclose the charging cable between the motor vehicle and the charging station.

In addition, it is possible that the protective device has a drive and an extendable guide rod, wherein the drive is arranged, for example attached, to a first end of the supporting frame and is designed for driving and/or for moving the guide rod. The extendable and/or telescopic guide rod and/or telescopic rod and/or a corresponding telescopic pipe has a first and a second end, wherein the distance between the two ends is modified via the drive. In doing so, the first end of the guide rod is arranged on, for example attached to, the drive. The second end of the guide rod is arranged on, for example attached to, a second end of the supporting frame. The drive is designed to modify, in the longitudinal direction, a length of the guide rod and thus also the length of the protective device and of the cavity thereby enclosed, which extend in the longitudinal direction, wherein the guide rod, and thus the protective device, is extended or shortened as needed with the drive. The guide rod is made, for example, of metal or of glass fiber material. The drive is, for example, electric and/or hydraulic. Furthermore, the guide rod may be bendable and/or flexible.

The system according to the invention has an embodiment of the presented protective device and a receiving device for receiving and/or housing said protective device, wherein said receiving device is arranged in an outer wall, accessible externally, of one of the two mechanisms. If the receiving device, for example, is arranged in the outer wall and/or in an outer region, accessible externally, of the vehicle designed, for example, as a motor vehicle, the protective device can be removed, unfolded, and/or folded out before the charging process by a user at a position outside of the motor vehicle and pulled over the charging cable, wherein the charging cable is accordingly pulled through the protective device. After the charging process, the protective device can be folded together by the user, likewise at a position outside of the motor vehicle, and arranged and/or stowed in the receiving device.

The method according to the invention is intended for protecting an electrical charging cable for electrically connecting two mechanisms in a charging process to a protective device, for example an embodiment of the previously presented protective device, for said electrical charging cable. The protective device has a supporting frame and a jacket, which enclose a cavity intended for the charging cable in a longitudinal direction in a tubular-shaped and/or tubular-like manner, wherein the cavity extends in the longitudinal direction, wherein the charging cable is enclosed by the protective device, wherein the supporting frame and the jacket are deformed in the longitudinal direction, wherein and/or whereby a length of the protective device is modified and adapted to a length of the charging cable, guided through the cavity, between the two mechanisms, wherein the charging cable is enclosed by the protective device and protected from any external environmental influences during the method, particularly during the charging process.

The method is implemented in design with and/or for an electrical charging process, in which, for example, a motor vehicle, as a first mechanism, is supplied with electrical energy via the charging cable, for example by an electrical charging station as a second mechanism, wherein the two mechanisms are electrically connected to one another for preparing the charging process and/or before the charging process via the charging cable, wherein the protective device is extended and unfolded and pulled over the charging cable and/or around the charging cable. Accordingly, the charging cable is pulled through the protective device, inserted into the protective device, and/or threaded into the protective device. Furthermore, the protective device is connected to at least one of the two mechanisms and/or attached to at least one of the two mechanisms, i.e. the protective device is connected and/or attached to at least the particular mechanism, from which the protective device until then has been or was disconnected, that is to which the protective device is not yet connected. In this case, it is provided that the protective device is connected to two mechanisms after it has been pulled over the charging cable. In doing so, the protective device encloses the charging cable. In this case, it is possible that the protective device is already connected and/or attached to one of the two mechanisms, for example to the motor vehicle or the charging station, typically in the folded state, independently of the charging process, wherein the charging cable is unfolded before the charging process, pulled over the charging cable, and temporarily connected and/or temporarily attached to the other of the two mechanisms, for example the charging station or the motor vehicle, in order to implement the charging process. After the charging process, the protective device is again disconnected from the other of the two mechanisms and/or removed.

Alternatively, it is also conceivable that the protective device is independent of the two mechanisms. In this case, the protective device is connected and/or attached to one of the two mechanisms, unfolded, pulled over the charging cable, and then connected and/or attached to the other of the two mechanisms, before the charging process. Alternatively, it is possible that the protective device is first pulled over the charging cable and then connected to the two mechanisms. After the charging process, the protective device is again disconnected from the respective one of the two mechanisms, folded, and removed from the charging cable.

As designed, a first end of the protective device is attached to one of the two mechanisms, for example the first mechanism, before the charging process and arranged in a receiving device of the first mechanism in the folded state, wherein the receiving device has an opening for placing the protective device on an outer wall of said mechanism, for example the first mechanism, wherein the protective device is pulled from the receiving device through the opening before the charging process and extended and/or unfolded in the longitudinal direction, wherein a second end of the protective device is temporarily and detachably connected to the other of the two mechanisms, for example the second mechanism, via an attachment device and/or temporarily, detachably attached to said mechanism, wherein the attachment device is disconnected and/or separated from the other, for example the second mechanism, after the charging process, wherein the protective device is arranged in the receiving device in the folded state and/or accommodated therein and/or housed.

The presented protective device is intended for a charging cable, which is formed to electrically connect a battery and a vehicle to a charging station and to direct current from the charging station, which is designed and/or to be characterized, for example, as the charging point, to the battery in the vehicle. The vehicle is driven and/or moved with an electric motor, which is formed to convert electrical energy, which is stored in the battery, to mechanical energy. The vehicle may be designed and/or characterized as a hybrid vehicle (plug-in hybrid electric vehicle, PHEV) or electric vehicle (battery electric vehicle, BEV).

In the design of the system and/or of the method, in the region of a contact module of the vehicle, which has a charging socket and can be closed with a cover, for example with a tank cover, the foldable protective device and/or protective sleeve for the charging cable is integrated, which is or will be permanently connected to the vehicle, particularly to a docking station, and can be removed optionally, for example, for cleaning. The protective device, which is designed and/or is to be characterized as a protective sleeve, is constructed here as a hose and consists of the supporting frame made of metal and/or of plastic and the jacket and/or a sleeve made of plastic and/or textile material, wherein the metal wire with the jacket made of plastic is telescopic and, in the retracted state, is stowed in an installation space behind the cover and/or tank cover of the contact module for the charging socket. When the vehicle (PHEV and/or BEV) is connected for charging, the protective sleeve is simply pulled over the charging cable and, for example, attached to the charging station and/or to at least one end of the charging cable with a magnet, a clamp, or a lock, wherein this involves a different end of the charging cable, for example, which is facing toward the charging station and away from the vehicle.

In one possible embodiment, the protective device designed and/or to be characterized as a hose is produced from a material that is especially mechanically resistant such that an additional protection against damage or theft exists for the charging cable.

The protective device is based on a protective sleeve, which is permanently connected in design to the vehicle, for example a passenger vehicle and/or motor vehicle, manually pulled over the charging cable, and attached and/or locked on the other end of the charging cable or at the charging point. In another embodiment, the protective device, which is designed, for example, as a protective sleeve, optionally has the electric drive, which is designed to modify the length of the protective device, wherein the protective device is extended and then again retracted in the longitudinal direction with the drive and the guide rod before an electrical charging and/or refueling process such that the driver does not soil his/her hands when folding the protective device together. During the charging process, only the protective device and/or protective sleeve is soiled, while the charging cable enclosed and protected by the protective device remains clean. The protective sleeve is attached, for example, in the outer region of the vehicle, for example in the region of the tank lid and/or tank cover such that no soiling results in the interior of the vehicle.

It is clear that the previously mentioned and subsequent features to be explained can not only be used in the combinations indicated but also in other combinations or alone without going beyond the scope of the present invention.

BRIEF DESCRIPTION OF THE DRAWINGS

The invention is schematically shown in the drawings by means of embodiments and is described schematically and extensively with reference to the drawings.

Figure 1:
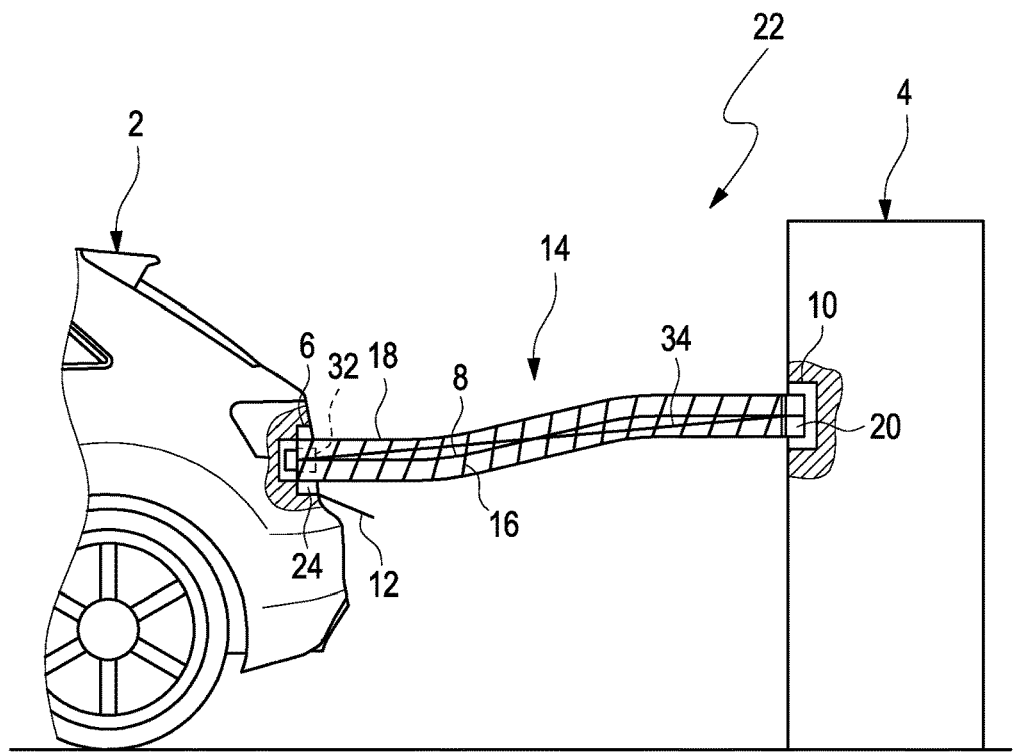
FIG. 1 shows a schematic representation of an embodiment of the system according to the invention, which has an embodiment of the protective device according to the invention, for implementing an embodiment of the method according to the invention.

The figures are cohesively and comprehensively described; equivalent reference numerals have been assigned to the same components.

DETAILED DESCRIPTION

FIG. 1 shows a schematic representation of a vehicle designed and/or to be characterized as a motor vehicle 2, which is driven and/or moved with electrical energy. To this end, it is necessary to charge the electrical energy to a battery of the motor vehicle 2. In doing so, the motor vehicle 2 is driven to a charging station 4 and parked nearby in order to implement a charging process. Furthermore, a first docking station 6 of the motor vehicle 2 is connected to a second docking station 10 of the charging station 4 via an electrical charging cable 8. This first docking station 6 of the motor vehicle 2 is designed as a recess and integrated in an outer region and/or in an outer region of the motor vehicle 2 and can be closed by a cover 12, wherein said cover 12 may also be characterized and/or designed as a tank cover.

Furthermore, FIG. 1 also shows the embodiment of the protective device 14 according to the invention, which in this case has a supporting frame 16 made of metal wire wound in a spiral or plastic wire and a jacket 18 made of plastic or textile material by way of example, wherein the supporting frame 16 and the jacket 18 are connected to one another here. The supporting frame 16 and the jacket 18 and/or the protective device 14, in the form of a hose here, enclose a cavity for receiving the charging cable 8. In doing so, FIG. 1 shows the protective device 14 in a mounted state. Furthermore, a length of the supporting frame 16 and of the jacket 18 and thus also a length of the protective device 14 can be varied in a longitudinal direction, particularly along the charging cable 8.

FIG. 1 also shows an electric or hydraulic drive 32, which is arranged at a first end of the supporting frame 16 and thus also at a first end of the protective device 14, wherein a respective first end is assigned to the docking station 6 of the motor vehicle 2 here. In addition, a first end of an extendable, for example telescopic, guide rod 34 is arranged on the drive 32, a second end of the guide rod 34 is arranged at a second end of the supporting frame 16 here, and thus at a second end of the protective device 14, wherein a respective second end is assigned to the docking station 10 of the charging station 4 here. In addition, a mechanical attachment device 20, by means of which the protective device 14 is temporarily attached to the charging station 4, is arranged at the second end of the supporting frame 16 and/or of the protective device 14. The guide rod 34 may be flexible in design and thus balance out a deviation of a shape of the protective device 14 along a straight longitudinal direction. Thus, the protective device 14 may be extended or shortened in a straight line with the guide rod 34. Because the guide rod 34 can be flexibly and/or elastically deformable, it can also be adapted to a respective shape of the protective device 14 when said protective device is partially bent and possibly sagging like a catenary.

The presented embodiment of the protective device 14 is also designed as a component of the embodiment of the system 22 according to the invention in this case. In doing so, the system 22 comprises a receiving device 24 as a further component, which is designed as an annular recess and/or as an annular opening in the docking station 6, which completely accommodates the protective device 14 when the protective device 14 is compressed and/or folded together and therefore has a minimum length. Further details regarding the protective device 14 and the system 22 arise from FIGS. 2, 3a, and 3b.

Figure 2:
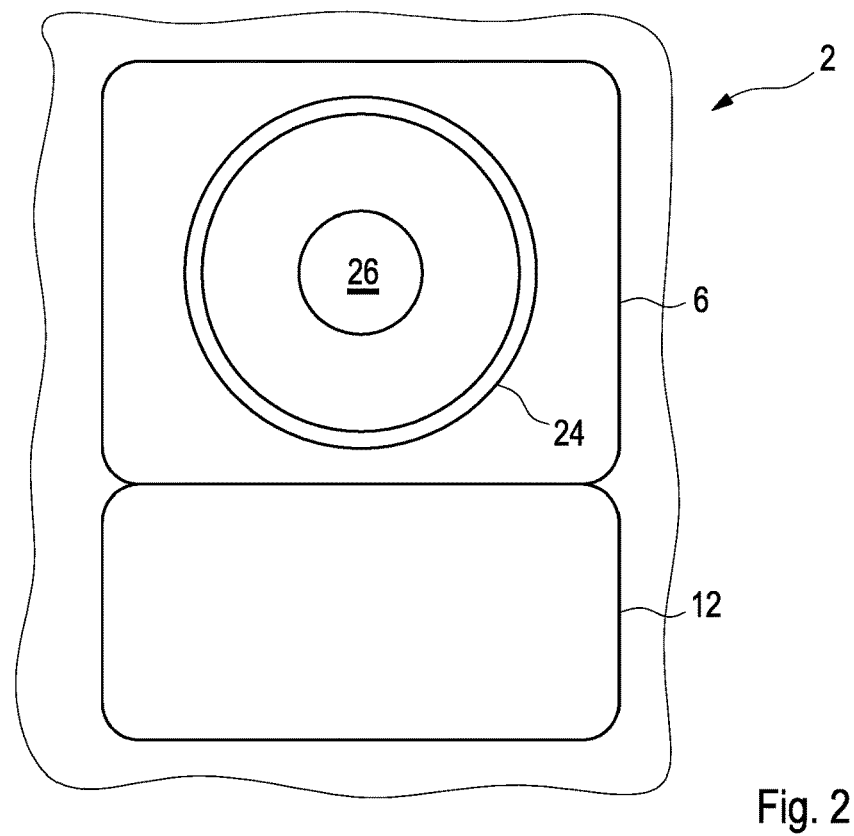
FIG. 2 shows a schematic representation from FIG. 1 in a detailed view.

In this case, FIG. 2 shows the first docking station 6 in the outer region of the motor vehicle 2 in a top view, with it being possible to close said docking station with the cover 12. An interface 26 for the charging cable 8 is also integrated in the docking station 6, in addition to the receiving device 24 for the protective device 14, said interface being designed and/or to be characterized here as an electrical plug element, for example as a socket outlet or plug socket depending on definition, and is further designed to accommodate a matching plug element of the charging cable 8, which is designed and/or to be characterized, for example, as a plug socket or as a socket outlet and which is facing and/or assigned to the motor vehicle 2.

In an alternative design of the first docking station 6 of the motor vehicle 2, it is conceivable that it only has the receiving device 24 for the protective device 14 and that the interface 26 is designed as an opening for the cable 8, wherein it is possible to completely insert the cable 8 into the interface 26 and thus into the first docking station 6.

Figure 3:
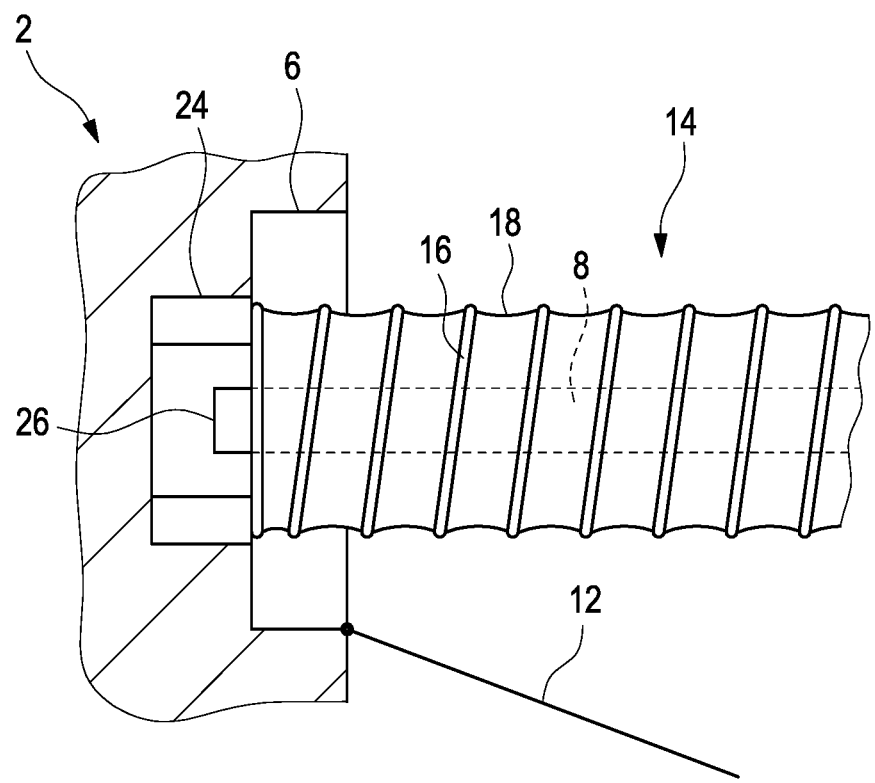
FIG. 3a shows a schematic representation of further details from FIG. 1.
FIG. 3b shows a schematic representation of further details from FIG. 1.
Figure 3:
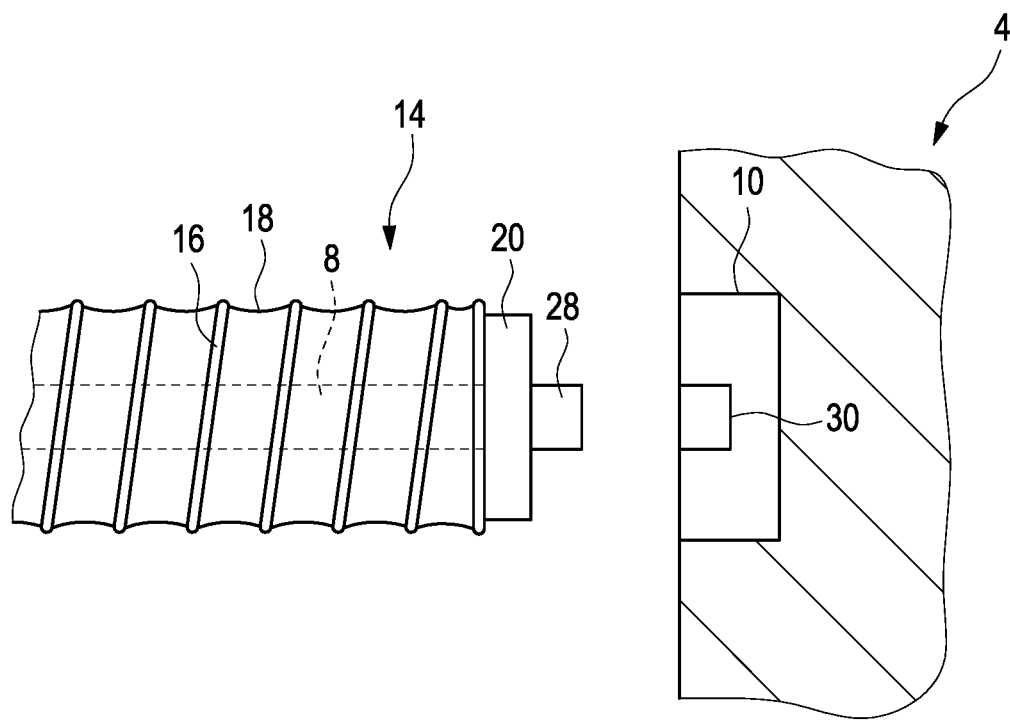

FIG. 3*a* shows a schematic sectional view of a first end of the charging cable 8 and a first end of the protective device 14, which are assigned here to the first docking station 6 of the motor vehicle 2. In contrast, FIG. 3*b* shows, in a schematic sectional view, a second end of the charging cable 8 and a second end of the protective device 14, which are assigned to the second docking station 10 of the charging station 4.

Both FIGS. 3*a* and 3*b* show details regarding a configuration of the hose-shaped protective device 14, which is designed to enclose the charging cable 8 and, in doing so, to provide a hose-shaped cavity for accommodating the charging cable 8. In detail, the protective device 14 here comprises a metal wire wound in a spiral and/or helix as a supporting frame 16, wherein a thread pitch between windings of the metal wire and/or of the supporting frame 16 can be modified. In addition, the jacket 18 is made of plastic and designed as a spiral strip here, which is connected to the supporting frame 16 and, for example, is bendably and/or elastically deformable. If the supporting frame 16 is extended in a longitudinal direction of the protective device 14, the result is that the jacket 18 is correspondingly elongated and/or unfolded. The cavity enclosed and/or encased by the protective device 14 extends in the longitudinal direction. If the supporting frame 16 is compressed and/or folded together on the other hand, the jacket 18 is correspondingly relaxed and/or folded together.

It is intended with the embodiment of the method according to the invention that the protective device 14 is completely folded together and particularly completely accommodated and/or housed in the receiving device 24 during a drive of the motor vehicle 2. As soon as the motor vehicle 2 is parked next to the charging station 4 for implementing the charging process, it is provided that, for example, an electrical contact element 28, which is designed and/or to be characterized as a plug, on the second end of the charging cable is inserted into a matching electrical contact element 30 on the second docking station 10 of the charging station 4, wherein one of the two contact elements 28, 30, for example plug elements, is designed as a socket outlet and the other as a plug socket. An electrical connection for transporting electrical energy from the charging station 4 to the battery is hereby provided between the charging station 4 and the battery of the motor vehicle 2 via the charging cable 8. It is then provided as a supplement with the embodiment of the method that the protective device 14 is unfolded from its folded state and pulled over the charging cable 8, wherein the charging cable 8 is enclosed by the protective device 14 and the cavity provided for this. As a supplement, the attachment device 20 is attached to the docking station 10 of the charging station 4. With the protective device 14, it is possible to protect the charging cable 8 between the motor vehicle 2 and the charging station 4, for example charging point, against soiling and/or damage during the charging process. After the charging process, the attachment device 20, and thus the protective device 14, is disconnected from the charging station 4, folded together, and placed in the receiving device 24.

The invention claimed is:

1. A protective device comprising:
    a supporting frame, wherein the supporting frame comprises a spiral-shaped wire;
    a jacket, wherein the jacket comprises a spiral strip, the supporting frame and the jacket surround a cavity, extending in a longitudinal direction that is configured to contain a charging cable, and the supporting frame and the jacket are deformable in the longitudinal direction to modify a length of the protective device.

2. The protective device according to claim 1, wherein at least one section of the supporting frame is connected to at least one section of the jacket.

3. The protective device according to claim 1, wherein the spiral-shaped wire comprises a polymer monofilament.

4. The protective device according to claim 1, further comprising:
    at least one attachment device, which is configured to connect at least one end of the protective device between a motor vehicle and a charging station.

5. The protective device according to claim 4, wherein the at least one attachment device is magnetic.

6. The protective device according to claim 1, further comprising:
    a drive, wherein the drive is arranged at a first end of the supporting frame; and
    a guide rod, wherein a first end of the guide rod is arranged on the drive, a second end of the guide rod is arranged on a second end of the supporting frame, the drive is configured to modify a length of the guide rod and the length of the protective device.

7. The protective device according to claim 1, wherein a thread pitch between windings of the spiral-shaped wire is configured to be modified.

8. A system comprising:
    a protective device further comprising:
        a supporting frame, wherein the supporting frame comprises a spiral-shaped wire;
        a jacket, wherein the jacket comprises a spiral strip, the supporting frame and the jacket surround a cavity, extending in a longitudinal direction that is configured to contain a charging cable, and the supporting frame and the jacket are deformable in the longitudinal direction to modify a length of the protective device; and
    a receiving device configured to contain the protective device.

9. A method of charging a motor vehicle comprising:
    parking the motor vehicle next to a charging station, wherein the motor vehicle has a first docking station and the charging station has a second docking station;
    connecting a charging cable between the first docking station and the second docking station;
    unfolding a protective device from a receiving device in the motor vehicle, wherein the protective device comprises a supporting frame, wherein the supporting frame comprises a spiral-shaped wire, and a jacket, wherein the jacket comprises a spiral strip, the supporting frame and the jacket surround a cavity, extending in a longitudinal direction that is configured to contain a charging cable, and the supporting frame and the jacket are deformable in the longitudinal direction to modify a length of the protective device;

pulling the protective device over the charging cable, wherein the charging cable is enclosed by the protective device.

10. The method according to claim 9, wherein a first end of the protective device is arranged in a receiving device of the motor vehicle, the receiving device has an opening on an outer wall of the motor vehicle and is removed from the receiving device and pulled through the opening and extended in the longitudinal direction, a second end of the protective device is connected to the charging station via an attachment device.

\* \* \* \* \*